United States Patent Office 3,244,650
Patented Apr. 5, 1966

3,244,650
STABILIZATION OF POLYPROPYLENE AGAINST DISCOLORATION, EMBRITTLEMENT AND REDUCTION IN MELT VISCOSITY
Arthur C. Hecker, Forest Hills, Otto S. Kauder, Jamaica, and Norman L. Perry, Seaford, N.Y., assignors to Argus Chemical Corporation, a corporation of New York
No Drawing. Filed May 27, 1960, Ser. No. 32,087
11 Claims. (Cl. 260—23)

This invention relates to stabilizer combinations useful in the stabilization of polypropylene against degradative deterioration in physical properties as a result of exposure to light and air, particularly at elevated temperatures, and to polypropylene compositions having increased stability against deterioration in physical properties due to the presence of such stabilizers, and to a process of stabilizing polypropylene, employing such stabilizers.

Polypropylene is a tough, high-melting polymeric material, but in several respects its stability leaves much to be desired. The polymer shows a tendency to decrease rapidly in melt viscosity and then to become brittle when kept at elevated temperatures for the time required in milling, calendering, extrusion, injection molding and fiber-forming equipment. This deterioration is particularly serious when the polymer is worked in the molten state in the presence of oxygen, e.g., air. Shaped polymers prepared in such equipment show a tendency to discolor, to become distorted, to crack, and to powder around the edges upon exposure to sunlight and during ageing, and especially when heated at elevated temperatures, really, an accelerated ageing process, and again, the problem is accentuated in the presence of oxygen.

To meet commercial requirements, it is, of course, quite important that the polymer retain its physical properties during processing and thereafter. However, the art has experienced great difficulty in achieving the necessary stabilization. In all probability, the changes leading to this deterioration in physical properties arise from chemical modification of the polymer. Whether this modification is due to oxidation or to some other effect is not yet known. Lack of knowledge of the reason naturally has hindered the development of satisfactory stabilizers.

Considerable research over the past few years to solve these problems has led to the suggestion of a variety of stabilizers to counteract one or more of these difficulties. Most polypropylene on the market today contains one of these stabilizers. However, no stabilizer or combination of stabilizers has yet been disclosed which is capable of coping with all of the stabilization problems. While it is now possible to stabilize polypropylene fairly well aaginst deterioration in melt viscosity, this stabilization is not always accompanied by an inhibition of deterioration in other respects, such as resistance to embrittlement and discoloration at elevated temperatures. Stabilizers which can cope with embrittlement are not capable of preventing discoloration, or reduction in melt viscosity.

Logically, it would seem that if one stabilizer does not do the entire job, a combination should. Groups of stabilizers, called "stabilizer systems," have been proposed. However, the effect of a plurality of stabilizers is impossible to predict from their effects individually, because the possible effects multiply with the number of stabilizers in the system. A stabilizer to be effective at all must be a reactive substance, and stabilizers can react with each other as well as with the polypropylene and with whatever leads to the deterioration. The various stabilizers thus can and do introduce unpredictable and undesirable side effects by reactions between themselves, and stabilizers which are capable of improving resistance to deterioration in some ways when combined may actually offset their individual effect, and increase the rate of deterioration in that or in other respects. This may be due to one stabilizer's effecting the desired improvement, and another stabilizer's reacting with and removing the first, and the reaction product's accelerating deterioration. In these circumstances, developing a stabilizer system which is capable of producing a polypropylene that has a good overall resistance to all of the deteriorative tendencies is obviously a quite complex problem. Up until now, the art has not known how to formulate such a system.

A further problem arises from the fact that polypropylenes tend to differ in their deteriorative tendencies according to the process by which they are prepared. Apparently, molecular weight and stereo-regularity (tacticity) are factors.

If the polypropylene manufacturer knows the use to which his polymer is to be put, he can of course tailor his stabilizers so as to meet fairly well the conditions to be encountered. However, such a stabilized polymer may not be useful for other purposes. In the absence of any better way, the manufactures have made available a great variety of polypropylenes for special purposes. Unless the customer can fit into one or more of the categories of special purpose materials, however, he may be in for a hard time. And if the material he wants is temporarily unavailable, he has to wait.

There exists a definite need for a stabilizer which will make any polypropylene sufficiently stable to be useful in all important processing methods and equipment, and which can be incorporated by the converter as well as by the manufacturer, if necessary to meet a special problem.

In accordance with the instant invention, such an all-purpose stabilizer system is provided. This stabilizer system not only improves the resistance of the polymer to discoloration and embrittlement with ageing and light at normal atmospheric and at elevated temperatures, but also improves the resistance of the polymer to reduction in melt viscosity when worked at elevated temperatures in the presence of oxygen.

The stabilizer system of the invention comprises three stabilizers, an organic polyhydric phenol, an organic phosphite, and a polyvalent metal salt of an organic acid. These three stabilizers together give an enhanced stabilization which is not obtainable from any of them alone or in combinations of two. When taken alone, the components of this stabilizer system are capable only of inhibiting deterioration in one or two respects, and quite large amounts may be needed before any effect is noted. In pairs, a depressant effect on the stabilizing effect of the individuals may be noted. For example, the phenol alone gives an improved resistance to the embrittlement and reduction in melt viscosity at elevated temperatures, but little assistance as to maintenance of color. The phosphite alone is a rather poor stabilizer in preventing deterioration in the first two properties, but it does assist in resisting discoloration. The two together are worse than the phenol alone in every respect except color, which is intermediate.

The polyvalent salt of an organic acid by itself only prevents discoloration. In combination with the phenol, the color is worse than with the salt alone, and in combination with phosphite only discoloration is prevented.

In view of this, it is surprising that the three taken together in the same total amount not only prevent discoloration but also embrittlement and inhibit reduction in melt viscosity. Furthermore, this enhanced stabilizing activity is obtained with any polypropylene, regardless of the process by which it is prepared.

The components of the stabilizer combination of the invention should have a very low vapor pressure at the working temperature, so that they will not be lost from the mix during hot-working, which in some instances requires a considerable period of time. Preferably, they are substantially nonvolatile at this temperature. They also should be compatible with the resin at all temperatures to which the composition is to be subjected.

The phenol contains two or more phenolic hydoxyl groups, and may contain one or more phenolic nuclei. In addition, the phenolic nucleus may contain an oxy or thio ether group.

The alkyl-substituted phenols and polynuclear phenols because of their molecular weight have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in any alkyl, alicyclidene and alkylene group, and a total of not over about fifty carbon atoms. The compounds may have from one to four alkyl radicals per phenol nucleus.

The phenol contains at least two phenolic hydroxyls in the same ring, if there is only one, or in the same or different rings if there are more than one. In the case of bicyclic phenols, the rings can be linked by thio or oxyether groups, or by alkylene, alicyclidene or arylidene groups. Such phenols can be defined by the formula:

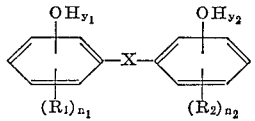

where X is an oxygen or sulfur atom, or an alkylene or alicyclidene or arylene or a mixed alkylene-alicyclidene or alkylene-arylidene group, having a straight or branched chain, whose total number of carbon atoms ranges from one to about eighteen, $y_1$ and $y_2$ are the number of phenolic hydroxyl groups OH, $n_1$ and $n_2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are

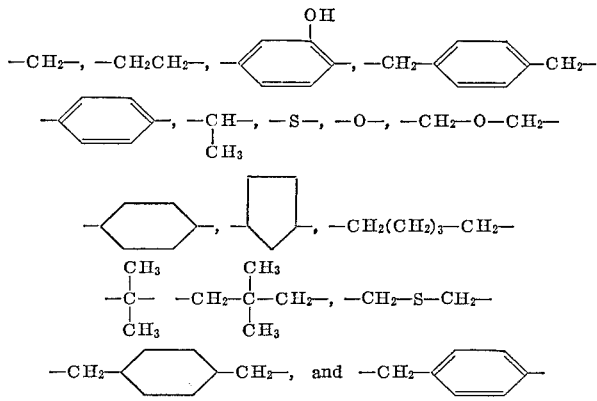

The various X and R groups are exemplified in the following compounds.

Exemplary of satisfactory polyhydric phenols are orcinol, catechol, resorcinol, p-octyl resorcinol, p-dodecyl resorcinol, p-octadecyl catechol, p-isooctyl-phloroglucinol, pyrogallol, hexahydroxy benzene, p-isohexyl-catechol, 2,6-ditertiary butyl resorcinol, 2,6-diisopropyl phloroglucinol, methylenebis - (2,6 - ditertiary butyl-m-cresol), methylenebis - (2,6 - ditertiary butyl phenol), 2,2 - bis(4-hydroxy phenyl) propane, methylenebis(p-cresol), 4,4'- thio - bisphenol, 4,4' - oxobis(3 - methyl - 6 - isopropyl phenol), 4,4' - thibis(3 - methyl - 6 - tertiary butyl phenol), 2,2' - oxobis - (4 - dodecyl phenol), 2,2' - thiobis(4 - methyl - 6 - tertiary butyl phenol), 2,6 - diisooctyl resorcinol, 4,4' - n - butylidenebis - 2,4 - butyl-5 - methylphenol), 4,4' - benzylidenebis(2 - t - butyl-5 - methylphenol), 2,2' - methylenebis - (4 - methyl - 6-1' - methylcyclohexylphenol), 4,4' - cyclohexylidenebis-(2 - t - butylphenol), 2,6 - bis(2' - hydroxy - 3' - t - butyl-5' - methylbenzyl) - 4 - methylphenol, 4 - octyl pyrogallol, and 3,5-ditertiary butyl catechol.

The organic phosphite can be any organic phosphite having the formula $(RA)_3P$ in which A can be oxygen or sulfur or a mixture of the same, and R can be selected from the group consisting of aryl, alkyl, cycloalkyl, aralkyl and alkaryl groups, in any combinations. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, di-isooctyl monotolyl phosphite, tri-2-ethyl hexyl phosphite, phenyl dicyclohexyl phosphite, phenyldiethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-alpha-naphthyl phosphite, tri(phenylphenyl) phosphite, tri(2-phenylethyl) phosphite, tridodecyl thiophosphite, tri-p-tert-butyl phenyl thiophosphite, dodecyl thiodiphenyl phosphite and tert-butyl phenyl thio-di-2-ethylhexyl phosphite.

The polyvalent metal salt of an organic acid will have ordinarily from about six to about twenty-four carbon atoms. The polyvalent metal can be any metal of Group II of the Periodic Table, such as zinc, calcium, cadmium, barium, magnesium, and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals, and other carbocyclic rring structures condensed therewith. The oxygen-containing heterocyclic compounds include oxygen and carbon in the ring structure, such as alkyl-substituted furoic acid. The aromatic acids which can be employed can be carbocyclic or oxygen-containing heterocyclic in structure, and the aromatic acids likewise can have nonreactive ring substituents such as halogen, alkyl and alkenyl groups and other saturated or aromatic rings condensed therewith.

As exemplary of the acids which can be used in the form of their metal salts there can be mentioned the following: hexoic acid, 2-ethyl-hexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petrolem, abietic acid, dihydroabietic acid, hexanhydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

A sufficient amount of the stabilizer combination is used to improve the stability against deterioration in physical properties, including, for example, discoloration, reduction in melt viscosity and embrittlement, under the conditions to which the polypropylene will be subjected. Very small amounts are usually adequate. Amounts within the range from about 0.005 to about 5% total stabilizers by weight of the polypropylene are satisfactory. Preferably, from 0.1 to 2.5% is employed for optimum stabilization.

Preferably, the stabilizer system comprises from about 0.025 to about 0.5% of the phenol, from about 0.05 to about 1.25% of the phosphite, and from about 0.025 to about 0.75% of the polyvalent metal salt. More than 1% of the phenol and more than 2.5% of the total stabilizers may evidence a lessened stabilizing effect or even a depressing effect on stabilization at high temperatures, above 275° C.

The stabilizer system of the invention can be formulated as a simple mixture for incorporation in the polymer by the polymer manufacturer or by the converter. An inert organic solvent can be used to facilitate handling, if the ingredients do not form a homogeneous mixture or solution. In some cases, the phenol is not very soluble in the phosphite at normal atmospheric temperatures.

Any difficulty in compatibility of phosphite and phenol is no problem if the mix is to be incorporated directly in the polymer. If the stabilizer system is to be sold as such, the compatibility can be improved by heating the phosphite and phenol at an elevated temperature for a sufficient time to form a homogeneous solution. This solution is quite stable at atmospheric temperatures and even below. Temperatures of from 100 to 200° C. can be used, under reflux if necessary. A small amount, from 0.02 to 1%, of an alkali or alkaline earth metal, as such or in the form of a compound which forms a salt with the phenol, such as the metal, the oxide or hydroxide, such as sodium hydroxide, potassium hydroxide, calcium oxide and calcium hydroxide, or the phenolate such as sodium phenolate, should be present to expedite the reaction, which is believed to be a transesterification of phosphite ester with the phenol, due to the fact that the alcohol or phenol that would be liberated by hydrolysis of the phosphite can be distilled out of the reaction mixture. Transesterification need not be complete; only a little, involving perhaps ⅓ of the phosphite ester groups of a triphosphite and ½ of the phenol groups of a dihydric phenol on a mole-for-mole basis, is enough to make phosphite and phenol compatible.

Polypropylene solid polymer can be defined in a manner to differentiate it from other polyolefins as having a density within the range of from 0.86 to 0.91, and a melting point above 150° C. The stabilizer system of the invention is applicable to all such polypropylenes, as distinguished from polypropylenes in the liquid form or in semi-liquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade names Pro-Fax, Escon and Olefane and having a softening or hot-working temperature of about 350° F., is an example of a sterically regular polypropylene polymer.

Mixtures of polypropylene with other compatible polymers and copolymers of polypropylene with copolymerizable monomers not reactive with the polypropylene stabilizer combination also can be stabilized, for example, mixtures of polyethylene and polypropylene, and copolymers of propylene and ethylene which have a sufficient amount of propylene to present the instability problem that is resolved by the stabilizer combinations of the invention.

The stabilizer combination is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The stabilizing effect of the stabilizer systems of the invention was evaluated in the working examples which follow in accordance with the following test procedures. The standard sample used in testing was 200 g., except for the Brabender Plastograph, which was 35 g. The stabilizers were incorporated as described in the working example and milled to a sheet. Pieces cut from the milled sheet were then used in the test procedures.

BRABENDER PLASTOGRAPH (REDUCTION IN MELT VISCOSITY)

This instrument is essentially a heated sigma-blade mixer in which the torque applied to the blades at 60 r.p.m. is continuously measured and plotted on a chart as kg.-cm. of torque. The bowl is maintained at 193° C. The charge is 35 g. of polypropylene. Temperature of the plastic is 205–215° C., owing to frictional heat build-up.

OVEN TEST, 205° C. (HEAT STABILITY)

Small squares cut from a milled sheet are exposed in a forced-draft air oven lying flat on aluminum foil. Samples are removed at 15 minute intervals and examined for loss of shape, flow-out, or melting, which constitute failure. Color is noted at failure.

COMPRESSION MOLDING, 190° C. (RESISTANCE TO EMBRITTLEMENT AND LOSS OF PLASTICITY)

Pieces cut from a milled sheet are compression-molded at 190° C. for five minutes to give 6 x 6 inch slabs 20 mils (about 0.5 mm.) or 75 mils thick. Plasticity and color are then noted.

HEAT AGEING, 150° C. OVEN (HEAT STABILITY OF MOLDED SAMPLES)

Molded samples made as above are heated flat on aluminum foil in an air circulating oven at 150° C. Samples are removed daily and examined for cracking or powdering, either of which constitutes failure. Color is noted at the end of two days, if the sample has not yet failed.

WEATHEROMETER (RESISTANCE TO LIGHT DETERIORATION)

The molded samples are held in a weatherometer at 51° C. black panel temperature, and noted every 16⅔ hours for development of cracking or powdering, either of which constitutes failure. Color is noted at the end of fifty hours.

COMPRESSION MOLDING AT HIGH TEMPERATURE, 287° C. (550° F.) (RESISTANCE TO EMBRITTLEMENT AND LOSS OF PLASTICITY AT HIGH TEMPERATURES)

Moldings are made as above, held in the mold thirty minutes at 287° C. (550° F.), cooled and examined for color and plasticity. Unstabilized as well as overstabilized formulations crack and discolor under these conditions.

The above tests are referred to in the examples as the standard tests.

The following examples in the opinion of the inventors represent the best embodiments of their invention:

Example 1

The stabilizer system of the invention was evaluated against the stabilizing effect of the various components thereof, taken singly and in pairs. The stabilizers used were 4,4'-thiobis(2-tertiary-butyl-5-methylphenol), isooctyl diphenyl phosphite, and zinc-2-ethylhexoate. In each case, a total of 0.5% stabilizer was used. The stabilizers were weighed and dispersed by hand, stirring in powdered previously unstabilized polypropylene (Pro-Fax 6501, reduced specific viscosity (RSV) 3.0, melt index 0.4, ASTM D1238–57T at 190° C.). The mixture was placed on a 2-roll mill and fluxed for five minutes at 170±2° C. Pieces cut from the milled sheet were used in the standard tests described above. The parts of stabilizer given are per 100 parts of polypropylene resin.

TABLE I

| Stabilizer System | A | B | C | D | E | F | G |
|---|---|---|---|---|---|---|---|
| 4,4'thiobis(2-tertiary-butyl-5-methylphenol) | 0.106 | 0.5 | | | 0.139 | 0.139 | |
| Isooctyl diphenyl phosphite | 0.277 | | 0.5 | | | 0.361 | 0.351 |
| Zinc-2-ethylhexoate | 0.117 | | | 0.5 | 0.361 | | 0.149 |

TABLE II.—BRABENDER PLASTOGRAPH, 193° C., 60 R.P.M. (KG.-CM. OF TORQUE)

| Stabilizer System | A | B | C | D | E | F | G |
|---|---|---|---|---|---|---|---|
| After 5 minutes working | 1,280 | 1,230 | 1,000 | <500 | 1,200 | 1,260 | 1,000 |
| After 15 minutes working | 1,240 | 1,080 | <500 | | 1,040 | 1,100 | <500 |
| After 25 minutes working | 1,140 | 1,040 | | | 1,010 | 1,020 | |
| Color, 25 minutes | Light gray | Dark brown | Colorless | Colorless | Dark brown | Yellow brown | Colorless |

TABLE III.—OVEN TEST, 205° C.

| Stabilizer System | A | B | C | D | E | F | G |
|---|---|---|---|---|---|---|---|
| Time to failure | 2 hrs | 1 hr. 45 min | 45 min | 15 min | 1 hr. 15 min | 1 hr. 15 min | 30 min. |
| Initial color | Colorless | Yellow | Colorless | Colorless | Yellow | Pale yellow | Colorless. |
| Color at failure | Light gray | Brown | do | do | Tan | do | Do. |

TABLE IV.—COMPRESSION MOLDING, 6 x 6 INCH SLABS, 20 AND 75 MILS THICK

| Stabilizer System | A | B | C | D | E | F | G |
|---|---|---|---|---|---|---|---|
| Condition | Good | Good | Good | Brittle | Good | Good | Good. |
| Color | Colorless | Yellow | Colorless | Colorless | Yellow | Pale yellow | Colorless. |

TABLE V.—HEAT AGEING, MOLDED 20 MIL SPECIMENS, 150° C.

| Stabilizer System | A | B | C | D | E | F | G |
|---|---|---|---|---|---|---|---|
| Days to failure | 6 | 5 | 1 | 1 | 2 | 3 | 1 |
| Color, 2 days | Light gray | Brown | | | Yellow brown | Yellow | |

TABLE VI.—WEATHEROMETER EXPOSURE, 20 MIL SPECIMENS, 51° C. BLACK PANEL TEMPERATURE

| Stabilizer System | A | B | C | D | E | F | G |
|---|---|---|---|---|---|---|---|
| Hours to failure | 116 | 83 | 50 | [1] | 66 | 116 | 66. |
| Color, 50 hours | Colorless | Yellow | Colorless | | Yellow | Pale yellow | Colorless |

[1] Brittle at start.

TABLE VII.—HIGH-TEMPERATURE COMPRESSION MOLDING, 287° C.

| Stabilizer System | A | B | C | D | E | F | G |
|---|---|---|---|---|---|---|---|
| Condition | Good | Brittle | Good | Brittle | Brittle | Good | Good. |
| Color | Colorless | Yellow | Colorless | Colorless | Yellow | Pale yellow | Colorless. |

The data show that the stabilizer system of the invention provides much better resistance to general deterioration in physical properties than any of the components taken singly or in pairs in the same amount. Only the stabilizer system of the invention is satisfactory as an all-around stabilizer, maintaining good color, melt viscosity, and good molding and ageing properties in all of these tests. This is achieved as a part of a very definite enhanced effect due to the combination.

The Brabender data show that the phenol alone (B) is not bad, but 0.5% is used, and color is very bad. The phosphite alone (C) and the metal salt alone (D) are ineffective, but color is retained. The mixtures of phenol and salt (E) and phenol and phosphite (F) are a little worse than the phenol alone, and now color is as bad as the phenol alone in (E) and intermediate in (F). Salt and phosphite (G) are the same as either alone. Yet all three together (A) make is possible to retain color and melt viscosity with ⅕ the amount of phenol.

The oven test 205° C. shows that phenol alone (B) is not bad, but 0.5% is used, and color is very bad. Phosphite alone (C) is not good, and metal salt alone (D) is ineffective to prevent embrittlement, but color is retained. All three pairs give results intermediate between the components by themselves. Yet all three (A) are better than any alone or in pairs, in the same amount.

The remaining data reinforce the Brabender and oven test data.

Example 2

A series of stabilized polypropylene compositions were prepared, using varying quantities of stabilizing systems in accordance with the invention. A blend of phosphite and phenol was prepared before incorporation with metal salt and the resin to prevent separation of the bisphenol. 100 g. of 4,4'-thiobis(2-tertiary-butyl-5-methylphenol), 150 g. isooctyl diphenyl phosphite, and 0.5 g. of calcium hydroxide were stirred and heated at 120 to 125° C. for three hours. At the end of this time, a clear brown solution had formed, and this solution remained homogeneous at room temperature. When the reaction mixture was heated at 125 to 135° C. under reduced pressure, phenol was distilled off, showing that transesterification had occurred. This 40% concentrate (content 40% total 4,4'-thiobis(2-tertiary-butyl-5-methyl phenol) was combined with more isooctyl diphenyl phosphite and with zinc-2-ethylhexoate to yield stabilizer blends of the following compositions:

TABLE VIII

| Stabilizer system | H | I | J | K |
|---|---|---|---|---|
| 4,4'-thiobis(2-tertiarybutyl-5-methylphenol) | 100 | 100 | 100 | 100 |
| Isooctyl diphenyl phosphite | 215 | 275 | 450 | 250 |
| Zinc-2-ethylhexoate | 65 | 125 | 300 | 300 |

Stabilized polypropylene samples were milled from Pro-Fax 6501, using one of the above stabilizer systems, following the procedure set forth in Example 1, and these samples were tested as described. In addition to the samples of 6501 stabilized by these stabilizer systems, three control formulations were included. One was Pro-Fax 6501 as purchased, without any stabilizer, and two were Pro-Fax 6511, a commercially available polypropylene, stabilized for general purpose use. One of the Pro-Fax 6511 samples was molded directly without heat treatment on the mill. The other controls were heat treated as were samples H to K so that they would be comparable.

The test results are shown in the table below.

TABLE IX

| Stabilizer System | Pro-Fax 6501 | Pro-Fax 6511 | Pro-Fax 6511 [1] | H | H | I |
|---|---|---|---|---|---|---|
| Amount of Stabilizer [2] | | | | 0.25 | 0.5 | 0.25 |
| Oven test 205° C., Time to failure | 15 min | 15 min | 30 min | 1 hour 45 min | 1 hour 45 min | 1 hour 45 min |
| Brabender, 193° C. 60 r.p.m.: | | | | | | |
| After 5 minutes | <500 | 1,000 | 1,100 | 1,400 | 1,400 | 1,350 |
| After 15 minutes | | 500 | 500 | 1,180 | 1,250 | 1,120 |
| After 25 minutes | | | | 1,030 | 1,130 | 1,060 |
| Compression molding 190° C., 20 mil slab: | | | | | | |
| Condition | Brittle | Good | Good | Good | Good | Good |
| Color | Colorless | Colorless | Colorless | Colorless | Colorless | Colorless |
| Heat Ageing 150° C. 20 mil specimens: | | | | | | |
| Days to failure | 1 | 1 | 2 | 4 | 7 | 3 |
| Color, 2 days | | | Light brown | Colorless | Light gray | Colorless |

| Stabilizer System | I | J | J | K | K |
|---|---|---|---|---|---|
| Amount of Stabilizer [2] | 0.5 | 0.5 | 1.0 | 0.5 | 1.0 |
| Oven test 205° C., Time to failure | 2 hours | 1 hour 45 min | 1 hour 45 min | 1 hour 45 min | 1 hour 45 min |
| Brabender, 193° C. 60 r.p.m.: | | | | | |
| After 5 minutes | 1,300 | 1,420 | 1,420 | 1,440 | 1,440 |
| After 15 minutes | 1,160 | 1,140 | 1,170 | 1,100 | 1,130 |
| After 25 minutes | 1,140 | 780 | 950 | 700 | 800 |
| Compression molding 190° C., 20 mil slab: | | | | | |
| Condition | Good | Good | Good | Good | Good |
| Color | Colorless | Colorless | Colorless | Colorless | Colorless |
| Heat Ageing 150° C. 20 mil specimens: | | | | | |
| Days to failure | 6 | 4 | 6 | 4 | 6 |
| Color, 2 days | Colorless | Colorless | Light gray | Light yellow | Light yellow |

[1] Not heated on the mill.
[2] Per 100 parts of resin.

The superiority of the stabilizer systems of the invention to the commercially available unstabilized and stabilized polypropylenes is evident from this data. Polypropylene stabilized in accordance with the invention has a much greater life in the oven test, much greater resistance to reduction in melt viscosity by the Brabender test, good molding properties, and the molded samples have better ageing properties.

Example 3

A variety of stabilizer systems in accordance with the invention were prepared, employing different organic phosphites. The procedure of Example 2 was followed in preparing a stable concentrate of 4,4'-thiobis(2-tertiary-butyl-5-methylphenol) and the phosphite named in the table. 100 g. of the phenol, 150 g. of the phosphite and 0.3 g. of metallic sodium, forming the sodium phenolate in situ, were stirred and heated from 120 to 125° C. for three hours, forming a homogeneous, clear, brown solution. This concentrate was combined with zinc-2-ethylhexoate in the ratio of 3:1, and the resulting systems tested in blends with Pro-Fax 6501 prepared as in Example 1 in a concentration of 0.5 part per 100 of resin.

milled to make it comparable to the other sample, and the other molded directly, that is, not milled previously. The results are shown in the following table:

TABLE XI

| Stabilizer System | Pro-Fax 6512 | | Q | R | S | T | U |
| --- | --- | --- | --- | --- | --- | --- | --- |
| | Milled | Not Milled | | | | | |
| Polyhydric Phenol | | | 4,4'-n-butyl-idene-bis(2-t-butyl-5-methylphenol). | 4,4'-benzyl-idene-bis(2-t-butyl-5-methylphenol). | 2,2'-methyl-ene-bis(4-methyl-6,1'-methyl cyclohexyl phenol). | 4,4'-cyclohex-ylidene-bis-(2-t-butyl-phenol). | 2,6-bis(2'-hy-droxy-3'-t-butyl-5'-methyl-benzyl-4-methylphenol). |
| Melt Index [1] (M1) | 1.02 | 0.89 | 0.52 | 0.48 | 0.44 | 0.55 | 0.51. |
| Oven test 205° C., Time to failure | 1 hour | 1 hour 30 min. | 1 hour 45 min. | 1 hour 30 min. | 1 hour 45 min. | 1 hour 30 min. | 1 hour 45 min. |
| Compression Molding: | | | | | | | |
| Condition | Good | Good | Good | Good | Good | Good | Good. |
| Color | Pale yellow | Pale yellow | Colorless | Colorless | Colorless | Colorless | Colorless. |
| Heat Ageing 150° C.: | | | | | | | |
| Color, 2 days | Light brown | Light brown | do | Light gray | do | do | Do. |
| Days to failure | 18 | 52 | 6 | 6 | 5 | 5 | 6. |
| High temperature Compression molding 30 minutes 287° C.: | | | | | | | |
| Condition | Good | Good | Good | Good | Good | Good | Good. |
| Melt Index (M2) | 9.7 | 7.0 | 1.85 | 2.23 | 1.07 | 2.20 | 1.54. |
| Melt Index Ratio M2/M1 | 9.5 | 7.9 | 3.6 | 4.6 | 2.4 | 4.0 | 3.0. |

[1] Of sheet before tests.

The phosphite used and the test results are given below:

TABLE X

| Stabilizer System | L | M | N | O | P |
| --- | --- | --- | --- | --- | --- |
| Phosphite | Triphenyl phosphite. | Tri(nonylphenyl) phosphite. | Tri(2-ethylhexyl) phosphite. | Phenyl di-(2-ethylhexyl) phosphite. | Mixed 2-ethyl-hexyl (octyl-phenyl) phosphite. |
| Oven test 205° C.: | | | | | |
| Time to failure | 1 hour 45 min | 1 hour 45 min | 1 hour 45 min | 1 hour 45 min | 1 hour 45 min. |
| Condition | Good | Good | Good | Good | Good. |
| Color | Colorless | Colorless | Colorless | Colorless | Colorless. |
| Heat ageing (150° C.): | | | | | |
| Days to failure | 5 | 5 | 4 | 5 | 5. |
| Color, 2 days | Pink | Pale yellow | Colorless | Colorless | Pale yellow. |

It is apparent that each of these phosphites is capable of imparting good stabilization to the polypropylene. The resins had excellent color retention after compression molding at 190° C. and after ageing of the molded samples at 150° C.

*Example 4*

A variety of stabilizer systems were prepared using the method described in Example 2, and the phenols described in the table below. Concentrates of phenol and phosphite were prepared as follows. 100 parts of isooctyl diphenyl phosphite, 32 g. of the phenol and 0.16 g. of sodium hydroxide were heated at 120 to 125° C. for three hours, forming a clear, brown, homogeneous concentrate. This concentrate was blended with zinc-2-ethylhexoate in the ratio of 7:2, and the resulting stabilizer systems incorporated in polypropylene (Pro-Fax 6501) according to the procedure of Example 2, in the concentration of 0.25 part of stabilizer system per 100 parts of resin. These resin blends were then tested by the standardized test procedures, in comparison with two controls, both of premium-priced commercially available heat-resistant polypropylene, Pro-Fax 6512, one The superiority of the polypropylenes stabilized by the stabilizer systems of the invention is evident from these data. These compositions had a better resistance to reduction in melt viscosity and to discoloration in the oven test 205° C. and in compression molding both at low and high temperatures. The resistance to heat ageing was adequate, although not as good as the controls.

*Example 5*

A variety of stabilizer systems were prepared in accordance with the invention, employing various polyvalent metal salts. The polypropylene used, Pro-Fax 6501, was milled with the stabilizer system according to the procedure of Example 2, and the milled sheets employed in the standardized tests. Each stabilizer system used contained, per 100 parts of resin, 0.1 part 4,4'-thiobis-(2-tertiary-butyl-5-methyl phenol) and 0.25 part isooctyl diphenyl phosphite. The quantity of metal salt was chosen so as to supply approximately the same number of chemical equivalents of each metal. The control formulas contained the same quantities of polyhydric phenol and phosphite, but no metal salt, the sodium salt or the lead salt.

The following test data was obtained:

TABLE XII

| Stabilizer System | Control | Control | Control | V | W | X | Y | Z |
|---|---|---|---|---|---|---|---|---|
| Polyvalent metal salt | No metal salt. | Sodium 2-ethyl-hexoate (50% solution).[2] | Lead 2-ethyl hexoate (24% Pb).[3] | Zinc-2-ethyl hexoate (50% solution).[3] | Calcium 2-ethylhexoate (50% solution).[2] | Magnesium 2-ethyl hexoate (50% solution).[2] | Strontium 2-ethyl hexoate (50% solution).[2] | Cadmium 2-ethyl hexoate (50% solution).[4] |
| Amount [1] | | 0.19 | 0.45 | 0.2 | 0.2 | 0.19 | 0.21 | 0.22. |
| Oven Test 205° C., Time to failure. | 1 hour 30 min. | 45 min. | 30 min. | 1 hour 45 min. | 1 hour 45 min. | 1 hour 45 min. | 1 hour 45 min. | 1 hour 45 min. |
| Compression Molding 75 mil molded samples, Color. | Colorless. | Colorless. | Light yellow. | Colorless. | Colorless. | Colorless. | Colorless. | Colorless. |
| Condition Heat Ageing 150° C.: | | | | | | | | |
| Color | Yellow. | do. | Brown. | Light gray. | Light gray. | Light gray. | Light gray. | Light gray. |
| Days to failure | 5. | 5. | 5. | 12. | 12. | 8. | 7. | 12. |

[1] Per 100 parts of resin.
[2] Methyl ethyl ketone, as solvent.
[3] 150–200° C. petroleum ether, as solvent, commercial product.
[4] Mixture of mineral spirits and 2-ethoxy ethanol, as solvent.

The very considerable improvement in stabilization obtained by the stabilizer system of the invention is evident from this data. The resistance to deterioration in the 150° C. and 205° C. oven tests, and the retention of color on compression molding and heat ageing, were very much superior. It will be noted that each of the Group II metal salts tested was effective. On the other hand, the sodium and lead salts were ineffective, in fact, worse in the 205° C. test than no salt at all.

*Example 6*

The stabilizer system of Example 2–I was employed to stabilize a variety of polypropylenes. Some of these polypropylenes contained stabilizers incorporated by the manufacturer, and are referred to as "prestabilized." The reduced specific viscosity and melt index of the polypropylenes which did not contain stabilizers are given in Table XIII, and the same properties of the prestabilized polypropylenes are given in Table XIV. 100 parts of the polypropylene was milled in the usual way with 0.5 part of stabilizer system I of Example 2. The control was polymer No. FF milled without a stabilizer. The test data follows:

TABLE XIII

| Polymer No. | AA | BB | CC | DD | EE | FF | Control |
|---|---|---|---|---|---|---|---|
| R.S.V. | 5.1 | 3.5 | 7.9 | 7.3 | 2.4 | 3.8 | |
| Melt Index | 0.34 | 0.57 | 0.14 | 0.18 | 2.3 | 0.49 | |
| Oven Test 205° C., Time to failure | 1 hour | 1 hour 45 min. | 1 hour 45 min. | 1 hour 45 min. | 1 hour 30 min. | 1 hour 45 min. | 15 min. |
| Compression Molding 20 mil Molded Samples, Color | Colorless. | Colorless. | Colorless. | Colorless. | Colorless. | Colorless. | |
| Heat ageing 150° C., Color, 2 days | do. | do. | Light gray. | Light gray. | do. | do. | |
| Days to failure | 4. | 6. | 3. | 4. | 9. | 5. | 1. |

As compared to the control, the improvement in resistance to failure and discoloration on heat ageing is evident.

The prestabilized polymers employed in the subsequent work were tested in three ways, reported in Table XIV: (a) milled as supplied, using the milled sheet to prepare molded samples; (b) molded directly without milling; (c) milled with 0.5 part of stabilizer system I of Example 2, and 5% Pro-Fax 6501 to facilitate dispersion of the stabilizer. (This was done because the prestabilized polymers were supplied in pellet form.) The resulting compositions were then tested by the standardized tests with the following results:

TABLE XIV

| | GG | | | HH | | | II | | |
|---|---|---|---|---|---|---|---|---|---|
| Polymer No. | (a) | (b) | (c) | (a) | (b) | (c) | (a) | (b) | (c) |
| R.S.V. | 5.1 | 5.1 | 5.1 | 2.1 | 2.1 | 2.1 | 3.7 | 3.7 | 3.7. |
| Melt Index | 0.40 | 0.40 | 0.40 | 3.1 | 3.1 | 3.1 | 0.55 | 0.55 | 0.55. |
| Oven Test 205° C., Time to failure | 30 min. | 30 min. | 1 hour 45 min. | 15 min. | 30 min. | 1 hour 15 min. | 45 min. | 45 min. | 1 hour 15 min. |
| Compression Molding, 20 mil molded samples, Color | Pale yellow. | Pale yellow. | Colorless. | Colorless. | Colorless. | Colorless. | Colorless. | Colorless. | Colorless. |
| Heat Ageing 150° C., Color, 2 days | | do. | Light gray. | | | Light gray. | Light gray. | do. | Pale yellow. |
| Days to failure | 1. | 2. | 11. | 1. | 1. | 12. | 2. | 4. | 14. |

The (c) samples in the above data are those prepared using the stabilizer system of the invention. The others are controls. The improvement in resistance to deterioration on heat ageing and against discoloration is apparent in these data.

The above results show that any polypropylene supplied without stabilizer can be well stabilized by the stabilizer systems of the invention, and that prestabilized polymers also can be improved, showing the superiority of the stabilizer system of the invention as compared to several of those now in use. The various samples tested here included a wide range of melt index and solution viscosities.

We claim:

1. A stabilizer combination for use in improving resistance of polypropylene to deterioration in physical properties on exposure to light and heat, consisting essentially of (1) a transesterified reaction product of an organic polyhydric phenol having from six to about fifty carbon atoms in an amount of from about 1 to about 20 parts by weight, and an organic phosphite triester free from phenolic hydroxyl groups having up to about 60 carbon atoms in an amount of from about 0.1 to about 50 parts by weight, obtained by a transesterification of the phenol and phosphite at an elevated temperature sufficient to form a homogeneous mixture and (2) a salt of an organic acid having from about six to about twenty-four carbon atoms and a metal of Group II of the Periodic Table in an amount of from about 0.05 to about 30 parts by weight, said stabilizer being compatible with polypropylene and having a low vapor pressure at polypropylene working temperatures.

2. A stabilizer combination in accordance with claim 1 in which the phenol has the formula:

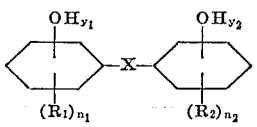

where X is selected from the group consisting of oxygen, sulfur, alkylene, alicyclidene, arylidene, and mixed alkylene-arylidene and alkylene-alicyclidene groups, the R groups are selected from the group consisting of hydrogen and alkyl groups having from one to about eighteen carbon atoms, and $y$ and $n$ represent the number of OH and R groups per ring, and in each ring the total of $y$ and $n$ does not exceed 5.

3. A stabilizer combination in accordance with claim 1 in which the organic phosphite triester has the formula $(RA)_3P$, in which A is selected from the group consisting of oxygen and sulfur and mixtures thereof, and R is selected from the group consisting of aryl, cycloalkyl, aralkyl and alkaryl groups aggregating a total of not more than about sixty carbon atoms.

4. A stabilizer combination in accordance with claim 1 in which the organic acid salt is an aliphatic fatty acid salt.

5. A stabilizer combination in accordance with claim 1 in which the phenol is 4,4'-thiobis-(2-tertiary-butyl-5-methyl-phenol).

6. A stabilizer combination in accordance with claim 1 in which the phenol is 4,4'-n-butylidene-bis-(3-methyl-6-tertiary-butyl phenol).

7. A stabilizer combination in accordance with claim 1 in which the phenol is 2,2'-methylene-bis(4-methyl-6,1'-methyl cyclohexyl phenol).

8. A stabilizer combination in accordance with claim 1 in which the phenol is 2,6-bis(2'-hydroxy-3'-tertiary-butyl-5-methyl-benzyl-4-methyl-phenol).

9. A stabilizer combination in accordance with claim 1 in which the phenol is 4,4'-benzylidene-bis(2-tertiary-butyl-5-methyl-phenol).

10. A stabilizer combination in accordance with claim 1 in which the metal salt is selected from the group consisting of zinc and calcium salts.

11. A stabilizer combination in accordance with claim 1 in which the phenol is 4,4'-cyclohexylidene-bis(2-tertiary-butyl-phenol).

References Cited by the Examiner

UNITED STATES PATENTS

| | | | |
|---|---|---|---|
| 2,448,799 | 9/1948 | Happoldt et al. | 260—23 |
| 2,710,821 | 6/1955 | Fischer | 260—45.7 |
| 2,716,092 | 8/1955 | Leistner et al. | 260—45.7 |
| 2,860,115 | 11/1958 | Hecker et al. | 260—23 |
| 2,867,594 | 1/1959 | Hansen et al. | 260—45.7 |
| 2,935,491 | 5/1960 | Mack | 260—45.95 |
| 2,985,617 | 5/1961 | Salyer et al. | 260—45.7 |
| 3,069,369 | 12/1962 | Galbraith et al. | 260—45.75 |
| 3,082,187 | 3/1963 | Fuchsman et al. | 260—45.7 |

FOREIGN PATENTS

| | | |
|---|---|---|
| 559,929 | 3/1957 | Italy. |
| 577,252 | 7/1959 | Belgium. |

LEON J. BERCOVITZ, *Primary Examiner.*

A. D. SULLIVAN, DONALD E. CZAJA, *Examiners.*